United States Patent [19]

Fima

[11] Patent Number: 5,161,890
[45] Date of Patent: Nov. 10, 1992

[54] METHOD AND SYSTEM FOR THE OPTICAL MEASUREMENT OF THE AIR TEMPERATURE BY LASER EXCITATION, PARTICULARLY IN FRONT OF AN AIRCRAFT

[75] Inventor: Henri Fima, Malissard, France
[73] Assignee: Sextant Avionique, Valence, France
[21] Appl. No.: 655,916
[22] Filed: Feb. 15, 1991
[30] Foreign Application Priority Data Feb. 22, 1990 [FR] France .................... 90 02180

[51] Int. Cl.$^5$ ............................................. G01J 5/00
[52] U.S. Cl. ...................................... 374/123; 374/120
[58] Field of Search ............... 374/120, 121, 122, 123

[56] References Cited

U.S. PATENT DOCUMENTS 3,380,055 4/1968 Fow et al. ................... 374/122 X
4,483,614 11/1984 Rogers .......................... 374/123 X

OTHER PUBLICATIONS

Lee et al, "Quantitative Imaging of Temperature Fields in Air Using Planar Laser-Induced Fluorescence of $O_2$", Optics Letters, vol. 12, No. 2 (Feb. 1987), pp. 75-77.
Miles et al, "Proposed Single-Pulse Two-Dimensional Temperature and Density Measurements of Oxygen and Air", Optics Letters, vol. 13, No. 3 (Mar. 1988), pp. 195-197.
Yoshino et al, "Atlas of the Schumann-Runge Absorption Bands of $O_2$ in the Wavelength Region 175-205 nm", J. Phys. Chem. Ref. Data, vol. 13, No. 1 (1984), pp. 207-227.
Cheung et al, "Herzberg Continuum Cross Section of Oxygen in the Wavelength Region 193.5-204.0 nm and Band Oscillator Strengths of the (0,0) and (1,0) Schumann-Runge Bands", Can. J. Phys., vol. 62 (1984), pp. 1752-1762.
Krupenie, "The Spectrum of Molecular Oxygen", J. Phys. Chem. Ref. Data, vol. 1, No. 2 (1972), pp. 426-434.
Lewis et al, "Experimentally Determined Oscillator Strengths and Linewidths for the Schumann-Runge Band System of Molecular Oxygen-II. The (2-0) to (5-0) Bands", J. Quant. Spectrosc. Radiat. Transfer, vol. 22 (1979), pp. 213-221.
Lee et al, "Calculations of O Absorption and Fluorescence at Elevated Temperatures for a Broadband Argon-Fluoride Laser Source at 193 nm", J. Quant. Specrtrosc. Radiat. Transfer, vol. 36, No. 5 (1986) pp. 425-440.
Lewis et al, "Oscillator Strengths for the Schumann-Runge Bands of $^{16}O_2$", J. Quant. Spectrosc. Radiat. Transfer, vol. 36, No. 3, (1986), pp. 209-232.
Lewis et al, "Rotational Vibrations of Predissociaton Linewidth in the Schumann-Runge Bands of $^{16}O_2$", J. Quant. Spectrosc. Radiat. Transfer, vol. 36, No. 3, (1986), pp. 187-207.
Harris et al, "Rydberg-Klein-Rees (RKR) Franck-Condon Factors for the O Schumann-Runge Sysem Including High Vibrational Quantum Numbers", Journal of Molecular Spectroscopy, vol. 30 (1969), pp. 506-512.
Andresen et al., entitled "Laser-Induced Fluorescence with Tunable Excimer Lasers as a Possible Method for Instantaneous Temperature Field Measurement at High Pressures: Checks with an Atmospheric Flame", vol. 27 No. 2, Jan. 15, 1988.
IEEE Journal of Quantum Electronics by Massey et al., entitled "Feasibility of Measuring Temperature and Density Fluctuations in Air Using Laser-Induced $O_2$ Fluorescence", vol. QE-20, No. 5, May 1984.

Primary Examiner—William A. Cuchlinski, Jr.
Assistant Examiner—W. Morris Worth
Attorney, Agent, or Firm—Lowe, Price, LeBlanc & Becker

[57] ABSTRACT

A method is disclosed for an optical remote measurement of the air temperature at a distance by laser excitation, in which, by means of a laser generator and by excitation of energy band transitions in the Schumann-Runge band of molecular oxygen, fluorescence of the oxygen is caused, the intensities of the fluorescence induced in two different bands are measured, the ratio of these intensities is determined and the temperature is derived therefrom wherein, on a section of appreciable depth, two absorption spectral lines are excited which at least overlap and which belong respectively to two different Schumann-Runge oxygen bands and the emission spectral line of the laser generator has a very small width with respect to that of the absorption spectral lines and its central frequency is adjusted to be substantially close to the maxima of the two absorption spectral lines.

15 Claims, 2 Drawing Sheets

METHOD AND SYSTEM FOR THE OPTICAL MEASUREMENT OF THE AIR TEMPERATURE BY LASER EXCITATION, PARTICULARLY IN FRONT OF AN AIRCRAFT

BACKGROUND OF THE INVENTION

1. Field of the Invention

The present invention relates to a method and system for an optical remote measurement of the temperature of the air, particularly in front of an aircraft, in a zone not disturbed by its movement.

The temperature of the air is one of the parameters which are displayed on the instrument panel of an aircraft and which are used, for controlling and piloting the aircraft, to elaborate then display some of the parameters of the aircraft, such for example as its airspeed, the mach number, its ground speed, its altitude, its power setting.

It was then a priori advantageous to invent an optical temperature measurement eliminating the drawbacks of conventional local measurements using a thermometer, which are subject to aerodynamic disturbances which must then be corrected.

Methods are already known for measuring the air temperature based on the laser induced fluorescence of oxygen. For putting them into practice, either an ArF (argon fluorine) laser, with a wavelength of 193 nm or a KrF laser (krypton fluorine), having a wavelength of 248 nm are used for energizing hot bands, at a high vibratory level, of the Schumann-Runge band of oxygen.

According to the Applicant, these known methods have only been used in the laboratory for studying the temperature distribution in flames and hot air flows. But these methods are only applicable with low absorption, i.e. when the exponential attenuation factor of the laser beam as a function of the distance can be linearized. In this case, there is proportionality between the fluorescence intensities and the populations of the lower states of the excited transitions, which makes it possible to calculate the temperature without knowing the oxygen density. In practice, that is tantamount to limiting the measurement distance to about 10 cm. To calculate the temperature in front of an aircraft, in an undisturbed zone, namely at about 10 m in front of the aircraft, these known methods cannot be applied because of the high attenuation of the beam. The fluorescence signals would be very complex functions of the temperature, of the density and of the spectral distribution of the laser and calculation would be practically impossible.

2. Description of the Prior Art

As part of the prior art there may be mentioned the article "Laser induced fluorescence with tunable exciter lasers as a possible method for instantaneous field measurements at high pressure : checks with an atmospheric flame, Andresen et al., 15 Jan. 1988, vol 27, no. 2, Applied Optics". This document deals with flame temperature measurements by excitation of OH, $O_2$ or $H_2O$ by a KrF laser and relates more particularly to the excitation of two transitions of the molecule considered by means of two laser pulses offset in frequency and determination of the ratio of the fluorescence intensities, via the populations of the lower levels of the two transitions, which only depends on the temperature.

The article "Quantitative imaging of temperature fields in air using planar laser induced fluorescence of $O_2$, Lee et al., 1987, vol 12, no. 2, Optics Letters" can also be cited. This document deals with the formation of two dimensional images of the temperature in hot air flows. It teaches focussing an untuned wide band ArF laser on the measurement volume and observing the fluorescence. Then spectral oxygen absorption lines are excited and the overall fluorescence, under low absorption conditions, may be imaged as a function of the temperature, except for a multiplier coefficient, proportional to the density. After absolute calibration, a thermal map may be formed having very good spatial resolution.

The article "Feasibility of measuring temperature and density fluctuations in air using laser induced $O_2$ fluorescence, Massey and Lemon, May 1984, vol QE-20, no. 5, IEEE Journal of Quantum Electronics" may further be mentioned. This document deals with the measurement of temperature and density fluctuations in space or in time and teaches using an ArF laser, with an averagely improved spectral line, for exciting two adjacent spectral lines P and R of the oxygen band $[X_0, B_4]$. With low absorption, the relative fluorescence variation observed may be linked to the relative temperature variation. For calculating this relative temperature variation, two laser pulses are used offset in frequency, exciting two pairs of spectral lines $P(J_1)$, $R(J+2)$ and $P(J_2)$, $R(J_2+2)$, respectively.

Finally, the article "Proposed single pulse two dimensional temperature and density measurements of oxygen and air, Miles et al., March 1988, vol 13, no. 3, Optics Letters" may be mentioned. This document deals with the same subject as the preceding one and teaches using an ArF laser tuned to a UV transition of oxygen and observing the Rayleigh diffusion and the fluorescence. With low absorption and at a temperature less than 500 K, the intensity of the Rayleigh backscatter is proportional to the density and is independent of the temperature and the fluorescence intensity depends on the density but also on the temperature. The ratio of the fluorescence and Rayleigh diffusion intensities only depends on the temperature and can be imaged.

The present invention proposes then first of all a method for the optical measurement of the air temperature, at a "great" distance.

SUMMARY OF THE INVENTION

For this, the present invention provides a method for an optical remote measurement of the air temperature by laser excitation, in which, by means of a laser generator and by excitation of energy band transitions in the Schumann-Runge band of molecular oxygen, fluorescence of the oxygen is caused, the intensities of the fluorescence induced in two different bands are measured, the ratio of these intensities is determined and the temperature is derived therefrom, characterized by the fact that, over a section of appreciable depth, two absorption spectral lines are excited which at least overlap and which belong respectively to two different Schumann-Runge oxygen bands and the emission spectral line of the laser generator has a very small width with respect to that of the absorption spectral lines and its central frequency is adjusted to be close to the maxima of the two absorption spectral lines.

Advantageously :

an ArF laser is used and the two bands $[X_0, B_4]$ and $[X_1, B_7]$ are excited, the spectral lines R19 of the band $[X_0, B_4]$ and P21 of the band $[X_1, B_7]$ are excited, the fluorescence of the fluorescence bands [B$_4$,X$_8$] and [B$_7$, X$_9$] having respective wavelengths of 249 nm and 247 nm is measured.

Preferably, the air temperature in front of an aircraft is determined in a slice of air free of aerodynamic disturbances and flight parameters of the aircraft are derived therefrom which are used for piloting same.

The present invention also relates to a measurement system for implementing the measurement method of the invention, characterized by the fact that it comprises a laser generator emitting radiation with a very fine spectral line, an optical system emitting the excitation radiation, an optimal system receiving the fluoroescence radiation, means for separating the two fluorescence energies, detectors tuned respectively to the fluorescence frequencies and a processing and computing module.

BRIEF DESCRIPTION OF THE DRAWINGS

The invention will be better understood from the following description of theoretical principles on which the invention is based, from the preferred implementation of the method of the invention as well as the preferred embodiment of the system of the invention, with reference to the accompanying drawings in which.

The overall energy of a molecule is the sum of its electron energy, its vibratory energy and its rotatory energy. This overall energy, from a fundamental electronic state, of lower energy, may occupy a series of different excited levels, with each fundamental and excited electronic energy level are associated several near-by levels of vibratory energy with each of which are associated several even closer levels of rotatory energy corresponding to several values of the quantal rotation number J. The electronic and vibratory energy of a molecule passes to an upper level, particularly under excitation, i.e. by absorption of photons, coming for example from laser radiation. The electronic and vibratory energy of a molecule passes to a lower level, particularly by fluorescence, i.e. by spontaneous emission of photons.

Two distinct vibratory levels $E_i$ and $E_j$ of electronic and vibratory energy define an absorption or fluorescence band, grouping together the whole of the possible transitions between two rotatory energy levels associated respectively with these two electronic and vibratory energy levels. To a transition $E_i(J_k)$, $E_j(J_1)$ there corresponds a spectral line, theoretically of a given frequency.

$$v = \frac{E_j(J_1) - E_i(J_k)}{h}$$

h being Planck's constant.

In actual fact, because of the thermal agitation (Doppler effect) and collisions, a spectral line, a curve representative of the absorption coefficient $\alpha$ as a function of the pulsation $\omega = 2\pi$, is widened in frequency (pulsation).

Figure 1:
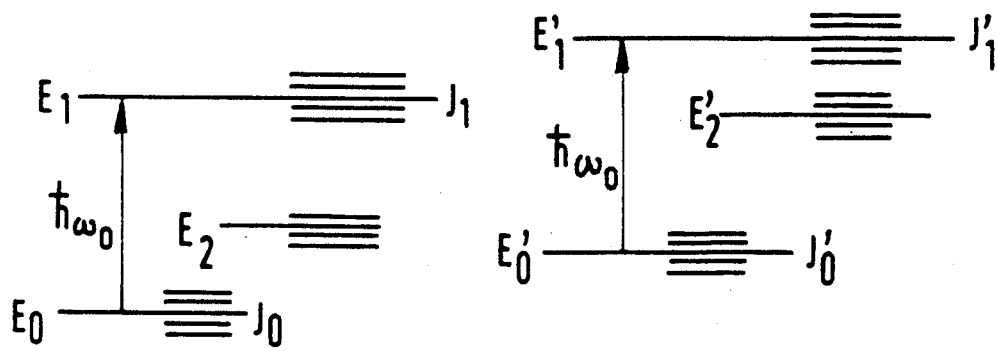
FIG. 1 is a schematic representation of electronic, vibratory and rotary energy levels of a molecule.

Let us consider two absorption spectral lines R[E$_0$)J$_0$, E$_1$(J$_1$)] and R'[E'$_0$)J'$_0$, E'$_1$(J'$_l$)] which almost merge, which therefore partially overlap and which belong respectively to two different absorption bands (E$_0$, E$_1$) and E'$_0$,E'$_1$) whose energy differences between centres E$_1$ − E$_0$ E'$_1$ − E'$_0$ are closely related, as shown in the diagram of energy levels of FIG. 1.

Roughly, we may write $$E_1(J_1) - E_0(J_0) = E'_1(J'_1) - E'_0(J'_0) = h\frac{W_0}{2\pi} = W_0$$

Let us also consider the fluorescence bands (E$_1$,E$_2$) and (E'$_1$,E'$_2$) such that the probabilities of radiative transition from E$_1$ to E$_2$ and from E'$_1$ to E'$_2$ are high.

Figure 2:
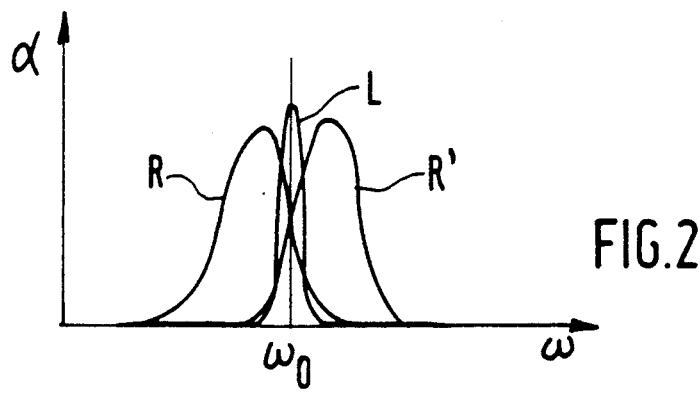
FIG. 2 is a representation of two absorption spectral lines and a laser excitation spectral line.

Let us further consider an excitation radiation L of pulsation $\omega_o$ close to the maxima of the two absorption spectral lines considered R and R', in accordance with the drawing of FIG. 2. Since it is a question of radiation with a very small spectral width, as excitation source we will consider a laser generator emitting a monochromatic parallel beam with a very fine spectral line.

The absorption spectral lines R(R') have as equation:

$$\alpha(\omega) = N\, S\,(T)\, g(\omega)$$

in which

N is the total number of absorbing molecules per unit of volume,

T is the temperature,

S(T) is the intensity of the spectral line; and g($\omega$) is the standardized profile of the spectral line, such that :

$$\int \alpha d\omega = NS(T)$$

g($\omega$) generally also depending on the temperature T and the pressure P.

The ratio of the fluorescence intensities, i.e. the ratio of the numbers of fluorescence photons received on the two bands, is equal to the ratio of the absorption coefficients $\alpha'/\alpha$ multiplied by the ratio of the fluorescence yields $\tau/\tau'$. The fluorescence yield is the ratio between the number of molecules whose energy has passed from the high level E$_1$ to the de-excited intermediate level E$_2$ by the spontaneous emission of photons and the total number of molecules excited at the high level E$_1$ by the laser radiation. The fluorescence yields also depend particularly on the temperature T and pressure P.

Let us now consider the Schumann-Runge bands of diatomic molecular oxygen which has electric dipolar transitions which can be used for excitation and fluorescence. They have in this case interesting features (Atlas of the Schumann-Runge O$_2$ absorption bands in the wavelength region 175-205 nm, Yoshino, Freeman, Parkinson J.Phys. Chem. Ref. Data, vol 13, no. 1, 1984.

These bands group together the transitions from the fundamental electronic state $^3\Sigma_g-$, reference X, to the excited electronic state $^3\Sigma_u-$, referenced B.

The excitation frequency corresponding to the transition between the two original levels, respectively rest and excitation levels, with zero vibratory energy (fundamental vibratory state), is equal to 49 357 cm$^{-1}$, corresponding to a wavelength of 203 nm. The spectrum of the Schumann-Runge bands extends, in its discrete part, over the whole ultraviolet range, as far as the minimum wavelength of 175 nm. In this zone, there exists the argon-fluorine (ArF) excimer laser, tunable in the 192.8 nm—193.6 nm wavelength band. Beyond, the Schumann-Runge continuum extends with a high effective absorption section $\alpha/N$ (the dimension of $\alpha/N$ is $m^2$ since the dimension of $\alpha$, inverse of the wavelength, is $m^{-1}$ and that of N is $m^{-3}$.

Widening of the spectral lines of the Schumann-Runge bands is in fact due to a phenomenon which dominates not only the Doppler effect but also molecular collisions. It is a question of the pre-dissociation of the molecules of the excited state B attributed to coupling with another repellent electronic state. The pre-dissociation probability, Q per unit of time, is very high and it is independent of the temperature and the pressure. Q in fact depends on the quantal numbers defining the energy level.

The result is that the standardized profile $g(\omega)$ of the spectral lines of the Schumann-Runge bands is practically not dependent on the temperature or pressure. Similarly, the fluorescence yields do not depend on the temperature or the pressure either, the pre-dissociation probability being distinctly greater than the transition probability by collision with change of vibratory state.

The ratio of the fluorescence intensities emitted on two bands, resulting from the excitation of the two spectral lines, which are practically merged as mentioned above, by the very fine spectral line laser generator also mentioned above, in the case of two Schumann-Runge bands, therefore only depends on temperature T and is proportional to the ratio of the intensities of the spectral lines $$\frac{S'(T)}{S(T)}$$

The exponential factor of attenuation of the laser beam is strictly eliminated. Since an absorption spectral line is proportional, like the absorption coefficient, to the relative population of the lower level of the transition, the ratio of the fluorescence intensities is therefore substantially equal to $$Ke^{-\frac{E_0(J'0)-E_0(J0)}{kT}}$$

k being Boltzmann's constant and K a constant. $E'_0$ and $E_0$ being two different vibratory levels, the energy difference $E'_0 - E_0$ is great with respect to kT, so that this ratio is very sensitive to the temperature. The measurement of this ratio of fluorescence intensities therefore allows the temperature to be calculated.

The air temperature may thus be determined by optical remote measurements, which has an advantage in the aeronautics field for determining the air parameters of an aircraft, such as the mach number, the speed of sound dependent on the temperature. The corrections, which are required when making local measurements which are subject to aerodynamic disturbances, may consequently be omitted.

To sum up, using a laser, particularly an ArF laser, the ambient air can be illuminated over a slice of relatively great depth for exciting, in two different Schumann-Runge bands, two "identical" absorption spectral lines, i.e. almost merging, with respect to which the laser emission spectral line is very fine.

Since it is a question of these particular bands, for which the pre-dissociation probability of the excited state is determinant, the ratio of the absorption coefficients only depends on the temperature and the fluorescence yields are independent of the temperature and the pre-dissociation probability. The ratio of the fluorescence energies (ratio of the numbers of fluorescence photons) in two different bands and resulting from absorption transitions only depends then on the temperature. It is sufficient to measure it to determine this temperature.

Having described the theoretical principles on which the invention is based, the latter will now be described.

MEASUREMENT SYSTEM

Figure 3:
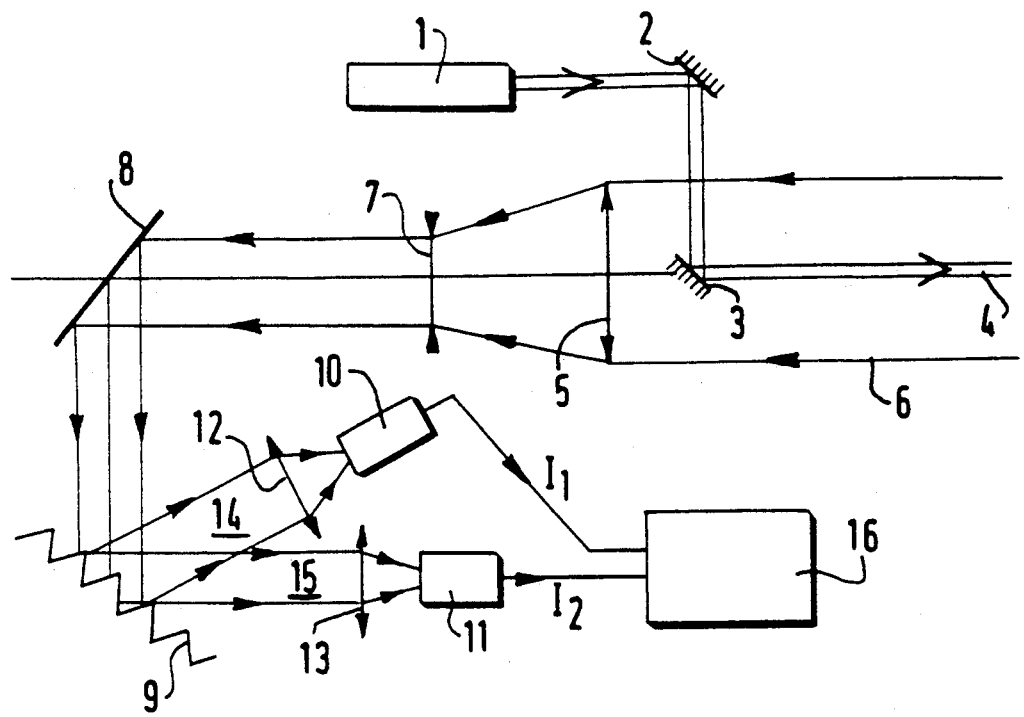
FIG. 3 is a schematic representation of the temperature measurement system of the invention.

The measuring system, shown in FIG. 3, here comprises an excimer ArF laser generator 1 here again of a wavelength substantially equal to 193 nm, emitting into space via two reflection mirrors 2 and 3 an excitation beam 4, a lens 5 for receiving the fluorescence beam 6 resulting from the excitation of the air molecules, a focussing lens 7, in this case a mirror reflecting the fluorescence beam 6, a network 9 on which the beam 6 is reflected at a reflection angle depending on the frequency, for separating the two fluorescence energies 14, 15, two detectors 10, 11 receiving respectively the fluorescence energies via two focussing lenses 12, 13 and a processing and computing module 16.

All the optics are of ultraviolet quality, for example made from UV silica.

Detectors 10,11 each comprise a photovoltaic effect photomultiplier vacuum tube, as amplifier, and a suitably tuned filter.

MEASUREMENT METHOD

The lifespan of the excited states $E_1$ and $E'_1$ is very short, less than 10 ps, because of the predissociation. The fluorescence of a given volume consequently only occurs during the passage of a laser pulse of duration $\tau$. Consequently, the measurement volume may be defined in time by the duration of the laser pulse, which advantageously simplifies the optical system.

Figure 4:
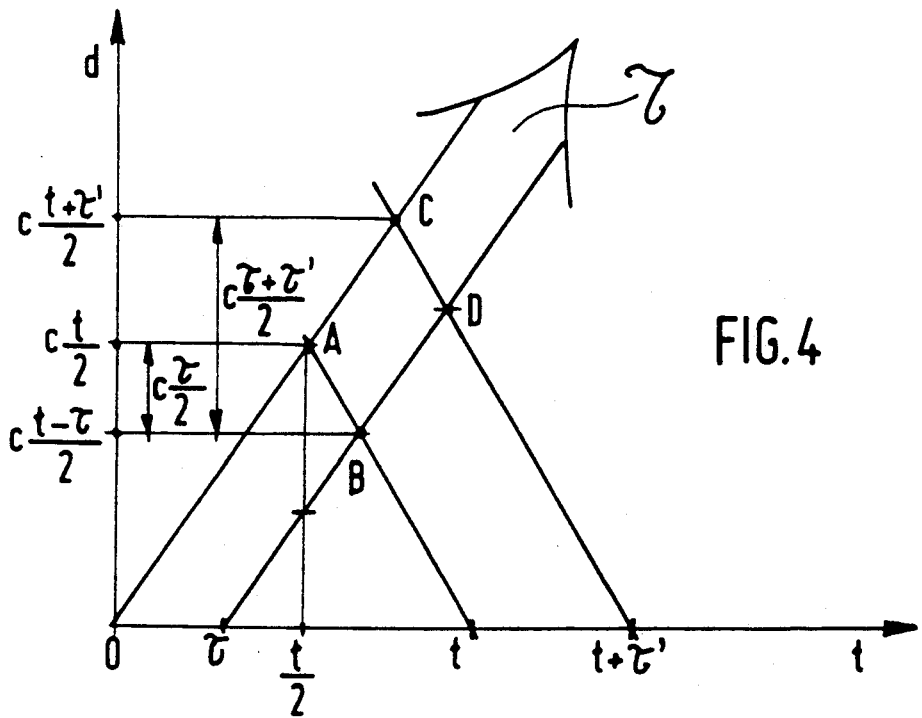
FIG. 4 is a representation in time and space of the slice of air sounds.

Transmitter 1 and receivers 10, 11 being practically at the same original position 0, the transmission and fluorescence diagram may be represented as a function of two variables, the measurement or sounding time t and distance d, along the laser beam 4 (FIG. 4). In this FIG. the space-time trajectory of a laser pulse of duration $\tau$ has been shown.

At each time t, greater than or equal to $\tau$, the fluorescence received comes from a slice in space AB of depth $c\tau/2$, c being the speed of light.

During the analysis time $\tau$ the instantaneous observation slice moves, at speed c, from AB to CD, i.e. by a distance $c\tau'/2$. The overall observed spatial slice $$\left\{ B\left(c\frac{t-\tau}{2}\right) - C\left(c\frac{t+\tau'}{2}\right) \right\}$$

has a depth of $$c\frac{\tau + \tau'}{2}$$

During this analysis time $\tau'$, the fluorescence energies 14, 15 are measured by detectors 10 and 11 in two different Schumann-Runge bands. More precisely, the photomultipliers 10, 11 deliver to module 16 two currents $I_1$ and $I_2$ which are integrated during times depending on the sounded air slice and its distance away, before the two integrals are calculated and their ratio determined.

As mentioned above, the ratio $$Ke^{-\frac{E_0-E_0}{kT}}$$

of the detected signals, stored in module 16, allows the temperature T to be calculated. Naturally, the measurement system will have been calibrated beforehand.

PRACTICAL MEASUREMENT CASE

It is only given by way of example.

The fluorescence analysis is carried out after the laser pulse of duration $\tau=10$ ns, between times $t=70$ ns and $t+\tau'=100$ ns ($\tau'=30$ ns). The sounded air slice extends then between two planes passing through B and C, with reference to FIG. 4, and spaced apart by 9 m and 15 m respectively.

The two integrals are then calculated:

$$1 = \int_t^{t+\tau} I_1 dt \quad 2 = \int_t^{t+\tau'} I_2 dt$$

From the ratio $\frac{1}{2} = Ke\frac{-E'_0 - E_0}{kt}$ T is derived.

The two integrals are then calculated:

$$1 = \int_t^{t+\tau} I_1 dt \quad 2 = \int_t^{t+\tau'} I_2 dt$$

From the ratio $$\frac{1}{2} = Ke\frac{-E'_0 - E_0}{kt}$$

T is derived.

The temperature is in fact determined after each laser pulse.

CHOICE OF THE PAIR OF ABSORPTION SPECTRAL LINES

Examination of the Schumann-Runge oxygen bands shows that there exist a few pairs of merged absorption spectral lines which may serve for measuring the temperature.

Figure 5:
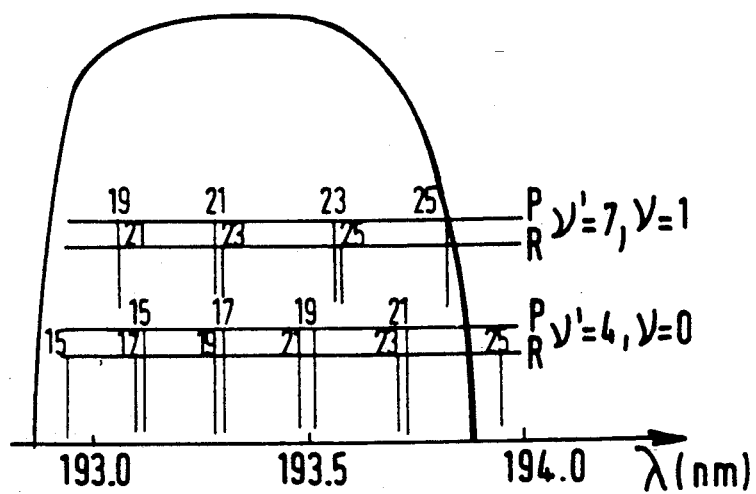
FIG. 5 is a representation of Schumann-Runge absorption bands in the locking band of the ArF laser.

In the locking band of the ArF laser (FIG. 5), there exist a number of spectral lines belonging particularly to two bands $[X_0, B_4]$ $[X_1, B_7]$ the indices 0, 1, 4, 7 of the electronic states X, B representing vibratory level numbers (vibrational quantal number) associated with these electronic states. It is a question of the spectral lines P17 of band $X_0, B_4$
R23 of band $X_1, B_7$
and
R19 of band $X_0, B_4$
P21 of band $X_1, B_7$ P and R, in the bands considered, correspond to the branches in which the difference between the orbital moments of the two states B and X is equal to $-1$ and $+1$ respectively.

The spectral lines of the first pair are merged to better than $0.1 cm^{-1}$ and those of the second pair are only separated by about $2 cm^{-1}$.

The spectral line width, due to pre-dissociation is about $3.4\ cm^{-1}$ for the band $[X_0, B_4$ and $1.4 cm^{-1}$ for the band $[X_1, B_7$ ( : the spectral lines considered indeed overlap. The choice of the pair of spectral lines must be determined by the sounding distance in order to optimize the signal/noise ratio. For a distance of about 10 m; the absorption coefficient of the spectral lines of the band $[X_O, B_4]$ is too high for a pressure of 1 bar and it is then advisable to choose the pair of spectral lines offset by $2 cm^{-1}$ and adjust the frequency of the laser to the centre of the spectral line of the band $[X_1, B_7$.

FLUORESCENCE BANDS

The fluorescence bands [B,X ] from levels $B_4$ and $B_7$ must be both intense and weakly absorbed. Furthermore, the fluorescence wavelengths must be chosen greater than 240 nm so as to be outside the Herzberg oxygen continuum (Herzberg continuum cross section of oxygen, Cheung et al., Canadian Journal of Physics, vol 62, pages 1752-1762, 1984).

All the interesting fluorescence bands fall however in Hartley's band of ozone which forms an absorption continuum extending to 360 nm. The absorption maximum occurs at 255 nm and the ozone concentration is maximum at an altitude of about 20 km with an absorption coefficient $\alpha max = 5.10^{-3} m^{-1}$. It has been observed that two intense fluorescence bands, among others, close to the absorption maximum of ozone, were in particular usable. These are the bands $[B_4, X_8]$ $[B_7, X_9]$ having respective wavelengths of 249 nm and 247 nm.

In the system of the invention such as described with reference to FIG. 3, the detectors 10,11 are tuned to the corresponding frequencies which are separated by the network 9. Since the absorption deviation of ozone is small, its influence on the ratio of the transmitted fluorescence energies is negligible between 0 and 30 km of altitude. In fact, it can be readily demonstrated that if the maximum deviation of the absorption coefficient is $5.10^{-4} m^{-1}$, the relative maximum variation of the transmission ratio is $5.10^{-3}$ for a distance of 10 m. To such a variation there corresponds a relative temperature variation ten times smaller. For a temperature of 300 K, the maximum temperature variation is therefore 0.15 K.

It should be noted that the performances of the measurement method and system of the invention are limited by the detection photon noise. But, for example, with the measurement distances considered above, a laser pulse energy of 0.01 J, an optical reception area of 100 $cm^2$ and an average of measurements made over 10 shots, between 0 and 20 km in altitude, the effective computing uncertainties due to photon noise are less than 0.5 K.

The measurement method which has just been described was based on a pair of absorption spectral lines in the locking band of the ArF laser.

The Applicant has sought, outside the band of this laser, all the pairs of merging spectral lines which can be used over two bands $[Xv_1, Bv'_1]$ and $[Xv_2, B_v, 2]$.

The vibrational quantal numbers $v_1$ and $v_2$ of the fundamental state must be equal to 0 or 1, so that the population of the corresponding states and so the absorption are sufficient. The number $v'_1$ has been limited to 4, for the spectral lines of the bands $[X_0, Bv, >4.]$ are too absorbent for a distance of 10 m. The values of $v'$ equal to 0 and 2 have been eliminated for, for them, the rate of pre-dissociation is not high enough for the profile of the spectral line to be independent of the pressure. With these restrictions posed, two other merging spectral lines have been found. These are the spectral line R25 of band $X_0, B_3$
R9 of band $X_1, B_5$ at a wavelength $\lambda = 196.2$ nm, R21 of band $X_0, B_1$
R5 of band $X_1, B_3$ at a wavelength $\tau = 200.9$ nm, the latter pair being however less interesting for the absorption coefficients are low. For the first pair an alexandrite laser could be used after multiplication of the frequency by 4. In this latter case, the fluorescence bands from levels $B_3$, $B_5$ which could be used would be $[B_3, X_8]$ and $[B_5, X_{10}]$

What is claimed is:

1. A method for remote optical measurement of air temperature by laser excitation which comprises the steps of:
   a) utilizing a single laser pulse to excite two absorption spectral lines of molecular oxygen in air, which two absorption spectral lines overlap and respectively belong to two different Schumann-Runge oxygen bands, said laser pulse having an emission spectral line width which is smaller than said two absorption spectral lines and a central frequency which is substantially close to the maximum frequency of said two absorption spectral lines;
   b) measuring the intensity of fluorescence induced in said air at said two different Schumann-Runge oxygen bands; and
   c) determining the temperature of said air utilizing said measured intensities of step b.

2. A method for remote optical measurement of air temperature by laser excitation according to claim 1, wherein fluorescent energies induced by the laser excitation are separated in accordance to frequency in step b.

3. A method for remote optical measurement of air temperature by laser excitation according to claim 1, wherein subsequent laser pulses are applied and the temperature of the air is determined after each laser pulse.

4. A method for remote optical measurement of air temperature by laser excitation according to claim 1, wherein the said two absorption spectral lines are chosen as a function of the distance at which it is desired to measure the temperature of the air.

5. A method for remote optical measurement of air temperature by laser excitation according to claim 1, wherein Schumann-Runge bands of a vibrational quantal number of the fundamental state 0 or 1 are excited.

6. A method for remote optical measurement of air temperature by laser excitation according to claim 5, wherein the laser pulse is provided by an ArF laser and the two bands $[X_0, B_4]$ and $[X_1, B_7]$ are excited.

7. A method for remote optical measurement of air temperature by laser excitation according to claim 6 wherein the spectral lines P17 of the band $[X_0, B_4]$ and R23 of the band $[X_1, B_7]$ are excited.

8. A method for remote optical measurement of air temperature by laser excitation according to claim 7 wherein the spectral lines R19 of the band $[X_0, B_4]$ and P21 of the band $[X_1, B_7]$ are excited.

9. A method of remote optical measurement of air temperature by laser excitation according to claim 8, wherein the frequency of the laser pulse is adjusted to the center of the spectral line P21 of the band $[X_1, B_7]$.

10. A method for remote optical measurement of air temperature by laser excitation according to claim 6, wherein fluorescent intensities of a wavelength greater than 240 nm are measured.

11. A method for remote optical measurement of air temperature by laser excitation according to claim 10, wherein the fluorescence of the fluorescence bands $[B_4, X_8]$ and $[B_7, X_9]$ of respective wavelengths 249 nm and 247 nm is measured.

12. A method for remote optical measurement of air temperature by laser excitation according to claim 5, wherein the absorption spectral lines R25 of band $[X_0, B_3]$ and R9 of band $[X_{12}, B_5]$ are excited.

13. A method for remote optical measurement of air temperature by laser excitation according to claim 1, wherein the air whose temperature is being measured is in front of a flying aircraft in a slice of air which is free of aerodynamic disturbances.

14. An apparatus for remote optical measurement of air temperature by laser excitation which comprises:
   a laser generator means for emitting a laser pulse of excitation radiation having a fine spectral line;
   first optical system means for directing the laser pulse from said laser generator into an air sample, the laser pulse having an emission spectral line width which is smaller than two absorption spectral lines of molecular oxygen which are excited by the laser pulse, the two absorption spectral lines overlapping and respectively belonging to two different Schumann-Runge oxygen bands, the laser pulse further having a central frequency which is substantially close to the maxima frequency of the two absorption spectral lines;
   second optical system means for receiving fluorescence radiation from molecular oxygen air which has been inducted by the laser pulse at the two different Schumann-Runge oxygen bands, said second optical system means including means for separating the two fluorescence energies, and means for separately detecting the two fluorescence energies and generating output current in response thereto; and
   a processing and computing means for calculating the temperature of the air from the output currents generated by the means for separately detecting the two separated fluorescence energies.

15. An apparatus for remote optical measurement of air temperature by laser excitation according to claim 14, wherein said laser generator means is an ArF laser generator which emits a monochromatic parallel beams with a fine spectral line centered on a wavelength which is substantially equal to 193 nm.

* * * * *